United States Patent [19]

Thungstrom et al.

[11] Patent Number: 5,663,489

[45] Date of Patent: Sep. 2, 1997

[54] METHODS AND APPARATUS FOR MONITORING WATER PROCESS EQUIPMENT

[75] Inventors: Eric A. Thungstrom, Wyndmoor; Paul R. Burgmayer, Wayne, both of Pa.

[73] Assignee: BetzDearborn Inc., Trevose, Pa.

[21] Appl. No.: 528,461

[22] Filed: Sep. 14, 1995

Related U.S. Application Data

[63] Continuation-in-part of Ser. No. 338,905, Nov. 14, 1994, Pat. No. 5,565,619.

[51] Int. Cl.$^6$ ............................................. G01M 3/32
[52] U.S. Cl. ....................... 73/40.7; 422/62; 436/55; 436/56
[58] Field of Search .................. 73/40, 40.7, 40.5 R, 73/49.2 T, 53.01, 61.41; 422/62; 436/50, 55, 56

[56] References Cited

U.S. PATENT DOCUMENTS

| | | | |
|---|---|---|---|
| 3,447,895 | 6/1969 | Hugh et al. | 23/48 |
| 3,723,347 | 3/1973 | Mitchell | 252/389 A |
| 3,849,655 | 11/1974 | Martucci | 250/366 |
| 3,891,568 | 6/1975 | Nishio et al. | 252/181 |
| 4,149,969 | 4/1979 | Robitaille et al. | 252/181 |
| 4,209,398 | 6/1980 | Li et al. | 252/180 |
| 4,251,220 | 2/1981 | Larson et al. | 23/230 R |
| 4,264,329 | 4/1981 | Beckett | 23/230 EP |
| 4,368,694 | 1/1983 | Ward et al. | 122/504 |
| 4,423,152 | 12/1983 | Lewis et al. | 436/56 |
| 4,443,340 | 4/1984 | May et al. | 252/181 |

(List continued on next page.)

OTHER PUBLICATIONS

Franco, R.J. et al., "Solving an Unusual Problem with Molybdates" Paper No. 133 (133/1 to 133/8) from Corrosion 85 (The International Corrosion Forum Devoted Exclusively to The Protection and Performance of Materials) Boston, MA Mar. 25–29, 1985.

Robitaille, Dennis R. "Two New Resources for Cooling Water Professionals" Cooling Water Topics vol. 1, No. 1 (Published by Amax Mineral Sales, Greenwich, CT) 1–4 Dec. 1986.

Penchuk, Tony "If It's That Safe, How Can It Be So Easy" Cooling Water Topics vol. 1, No. 2 (Published by Amax Mineral Sales, Greenwich, CT), 1–4 Jun. 1987.

Robitaille, D.R., "Soldium Molybdate as a Corrosion Inhibitor in Cooling Tower Water" from Materials Performance 15 pp. 40–44 (an Official NACE Publication) Nov. 1976.

Stranick, M.A. "The Corrosion Inhibition of Metals by Molybdate Part I. Mild Steel" Corrosion—NACE 296–297 (1984).

(List continued on next page.)

Primary Examiner—Michael Brock
Attorney, Agent, or Firm—Alexander D. Ricci; Philip H. Von Neida

[57] ABSTRACT

Methods and apparatus are provided for using tracers to monitor industrial process equipment to which liquid is added and from which liquid is removed. In preferred embodiments, the methods are directed to detecting water leakage in a boiler in which an aqueous temperature control liquid is supplemented with feedwater at a known or unknown rate and is removed as blowdown, sootblower steam and steam at a known rate. The methods include determining the blowdown removal rate, adding a tracer to the temperature control liquid at a rate that is directly proportional to the blowdown removal rate, analyzing the blowdown to determine the measured concentration of tracer contained therein, deriving an expected concentration of tracer in the blowdown, comparing the measured and expected concentrations to detect excessive variance between them, and also determining the rate of feedwater supplementation, monitoring the rate of blowdown, sootblower steam and steam removal, and comparing the difference between the supplementation and removal to detect excessive variation between them.

31 Claims, 2 Drawing Sheets

U.S. PATENT DOCUMENTS

| | | | |
|---|---|---|---|
| 4,462,319 | 7/1984 | Larsen | 110/238 |
| 4,472,354 | 9/1984 | Passell et al. | 436/38 |
| 4,478,941 | 10/1984 | Hillshafer | 436/56 |
| 4,498,333 | 2/1985 | Parthasarathy | 73/40.5 A |
| 4,499,003 | 2/1985 | Foroulis | 252/389 R |
| 4,502,322 | 3/1985 | Tero | 73/40.5 A |
| 4,534,866 | 8/1985 | Becker | 252/180 |
| 4,590,036 | 5/1986 | Foroulis | 252/192 |
| 4,640,793 | 2/1987 | Persinski et al. | 252/180 |
| 4,659,676 | 4/1987 | Rhyne, Jr. | 436/56 |
| 4,663,053 | 5/1987 | Geiger | 210/699 |
| 4,664,884 | 5/1987 | Mullins et al. | 210/699 |
| 4,724,799 | 2/1988 | Traiteur et al. | 122/504 |
| 4,777,140 | 10/1988 | Rudnick | 436/55 |
| 4,783,314 | 11/1988 | Hoots et al. | 422/3 |
| 4,822,744 | 4/1989 | Bellows | 436/38 |
| 4,828,795 | 5/1989 | Cook et al. | 252/180 |
| 4,944,885 | 7/1990 | Chen | 252/180 |
| 4,966,711 | 10/1990 | Hoots et al. | 210/697 |
| 4,992,380 | 2/1991 | Moriarty et al. | 436/55 |
| 5,006,311 | 4/1991 | Hoots et al. | 422/62 |
| 5,041,386 | 8/1991 | Pierce et al. | 436/50 |
| 5,128,419 | 7/1992 | Fong et al. | 525/351 |
| 5,171,450 | 12/1992 | Hoots | 210/701 |
| 5,200,106 | 4/1993 | Hoots et al. | 252/181 |
| 5,304,800 | 4/1994 | Hoots et al. | 250/302 |
| 5,320,967 | 6/1994 | Avallone et al. | 436/50 |
| 5,363,693 | 11/1994 | Nevruz | 73/40.5 R |
| 5,411,889 | 5/1995 | Hoots et al. | 436/6 |
| 5,416,323 | 5/1995 | Hoots et al. | 250/302 |
| 5,565,619 | 10/1996 | Thungstrom et al. | 73/40.7 |

OTHER PUBLICATIONS

Schroeder, Henry A. et al., "Essential Trace Metals in Man: Molybdenum" J.Chron. Dis. 23: 481–499 (Pergamon Press, Great Britain) (1970).

"Climax Molyhibit 100: The High–Performance Corrosion Inhibitor With No Problems" Brochure of AMAX MINERAL SALES printed Dec. 1986 (1987 AMAX MINERALS all rights reserved).

Macdonald, James R., "Choosing the correct cooling–water program" 135–138 Chemical Engineering/Jan. 19, 1987.

"1986 Cooling Tower Institute's Annual Meeting Operating Seminar" pp. 7, 14 and 15 of J. of the Cooling Tower Institute vol. 8, No. 1 1986.

Robitaille, Dennis R. "The Hidden Cost of General Moly" Cooling Water Topics vol. 2, No. 4 (Published by Amax Mineral Sales, Greenwich, CT) 1–4 Jan. 1988.

Sittig, Marshall "Molybdenum" from TOXIC METALS: Pollution Control and Worker Protection 277–282 Noyes Data Corporation, Park Ridge, NJ 1976.

METHODS AND APPARATUS FOR MONITORING WATER PROCESS EQUIPMENT

This application is a continuation-in-part of Ser. No. 08/338,905, filed Nov. 14, 1994, now U.S. Pat. No. 5,565,619.

FIELD OF THE INVENTION

The present invention is directed to methods and apparatus for monitoring industrial water process equipment. More particularly, the invention is directed to the detection of leaks in water process equipment such as black liquor recovery boilers.

BACKGROUND OF THE INVENTION

A boiler is an apparatus in which water or some other aqueous temperature control liquid to which makeup water is added and from which blowdown is removed is vaporized into steam by the application of heat from a furnace or heat-generating process system. In most instances, the temperature control liquid is brought into close, indirect contact with the process system to facilitate heat transfer. Leakage in a boiler can result not only in contamination and fouling of the temperature control liquid and the process system, but also in undesired chemical reactions. This is particularly true for the black liquor recovery boilers used in many paper mills. In black liquor recovery boilers, the escape or leakage of aqueous temperature control liquid from the so-called "water side" of the boiler into the hot, highly caustic "fire side" can result in violent explosions.

The prior art provides numerous techniques for monitoring and controlling leaks in black liquor recovery boilers and other boiler systems. For example, U.S. Pat. No. 5,320,967 (Avallone, et al.) discloses a boiler system leak detection method that involves introducing an inert tracer to the boiler in a known and uniform proportion to the feedwater, sensing a characteristic of the tracer in the boiler at steady state, converting the sensed characteristic to a value equivalent to the concentration of the tracer in the temperature control liquid, and activating a signal when there is excessive variance in the concentration of the tracer. However, the method disclosed by Avallone, et al. is limited by its requirement that the tracer be detected (sensed) when the boiler is at steady state, which is said to occur only when there is no significant change in any of five process parameters: the concentration of the tracer in the boiler; the blowdown rate; the feedwater rate; the rate of feeding tracer to the boiler; and the steaming rate in the absence of boiler leakage.

Consequently, there remains a need in the art for more flexible leak detection methods which can be employed in boiler systems that are not at steady state, that is, where one or more process parameters is subject to change.

OBJECTS OF THE INVENTION

It is one object of the present invention to provide methods and apparatus for leak detection in industrial boilers.

It is a further object of the invention to provide methods and apparatus for detecting leaks in black liquor recovery boilers.

It is yet another object of the invention to provide methods and apparatus that can be used in boiler systems other than those operating at steady state.

BRIEF DESCRIPTION OF THE INVENTION

These and other objects are satisfied by the present invention, which provides methods and apparatus for the detection of leaks in boilers to which liquid is added and from which liquid is removed. In preferred embodiments, an aqueous temperature control liquid is supplemented over time with feedwater at a known or unknown rate and is removed as blowdown at a known rate. The methods of the invention include adding a non-volatile tracer to a liquid containment means in the boiler at a rate that is directly proportional to the liquid removal rate. Following addition of the tracer, the liquid exiting the containment means is analyzed to determine the measured concentration of tracer contained therein. An expected concentration of tracer in the removed liquid then is calculated based on the rate at which tracer has been added to the containment means. The expected tracer concentration and measured tracer concentration then are compared, preferably by subtraction. A positive remainder (over and above statistically-derived baseline noise level) indicates a possibility that tracer is exiting the boiler other than in the removal liquid. If the remainder lies outside an acceptable range, an operator initiates an investigation of the boiler for leaks.

In another embodiment of the present invention, the chemical tracer concentration method is combined with a water mass balance method. The amount or weight of water entering the boiler as feedwater supplementation and the amount or weight of water exiting the boiler as blowdown, sootblower steam and steam are measured by conventional means. The amounts entering and exiting are compared, preferably by subtraction means. If there is a positive difference in the amounts that is larger than a defined statistically significant number, then more water is exiting the liquid containment means than is entering. This alerts an operator to begin investigation of the liquid containment means for leaks. When simultaneously used in conjunction with the chemical tracer concentration method, this combined method offers an operator a combination means to monitor the liquid containment means of a boiler for leaks.

The present invention also provides apparatus suitable for indicating leaks in boilers. Apparatus according to the invention comprise: flow monitoring means for monitoring a rate associated with liquid removal; addition means for adding tracer to the liquid containment means at a rate that is proportional to the rate at which liquid is removed therefrom; measuring means in communication with the addition means for measuring the concentration of the tracer in the removed liquid; derivation means in communication with the measuring means for deriving an expected concentration of tracer in the removed liquid based on the rate of tracer addition; comparison means in communication with the measuring means for compared the measured and expected tracer concentrations; measuring means in communication with feedwater supplementation means; measuring means in contact with blowdown, sootblower steam, and main steam removal means; and comparison means in communication with said measuring means for comparing the feedwater supplementation with removal.

BRIEF DESCRIPTION OF THE DRAWING

The numerous objects and advantages of the present invention may be better understood by those skilled in the art by reference to the accompanying FIG. 1, a schematic representation of a monitoring system according to the invention.

DETAILED DESCRIPTION OF THE INVENTION

The methods and apparatus of the present invention can be used to monitor virtually any type of equipment to which liquid is added and from which liquid is removed. The methods and apparatus of the invention preferably are used to monitor boilers, especially black liquor recovery boilers. Representative boilers are disclosed by U.S. Pat. No. 3,447, 895 (Nelson, et al.), U.S. Pat. No. 4,462,319 (Larson), U.S. Pat. No. 4,498,333 (Parthasarathy), and U.S. Pat. No. 4,502, 322 (Tero), the contents of which are incorporated herein by reference.

Figure 1:
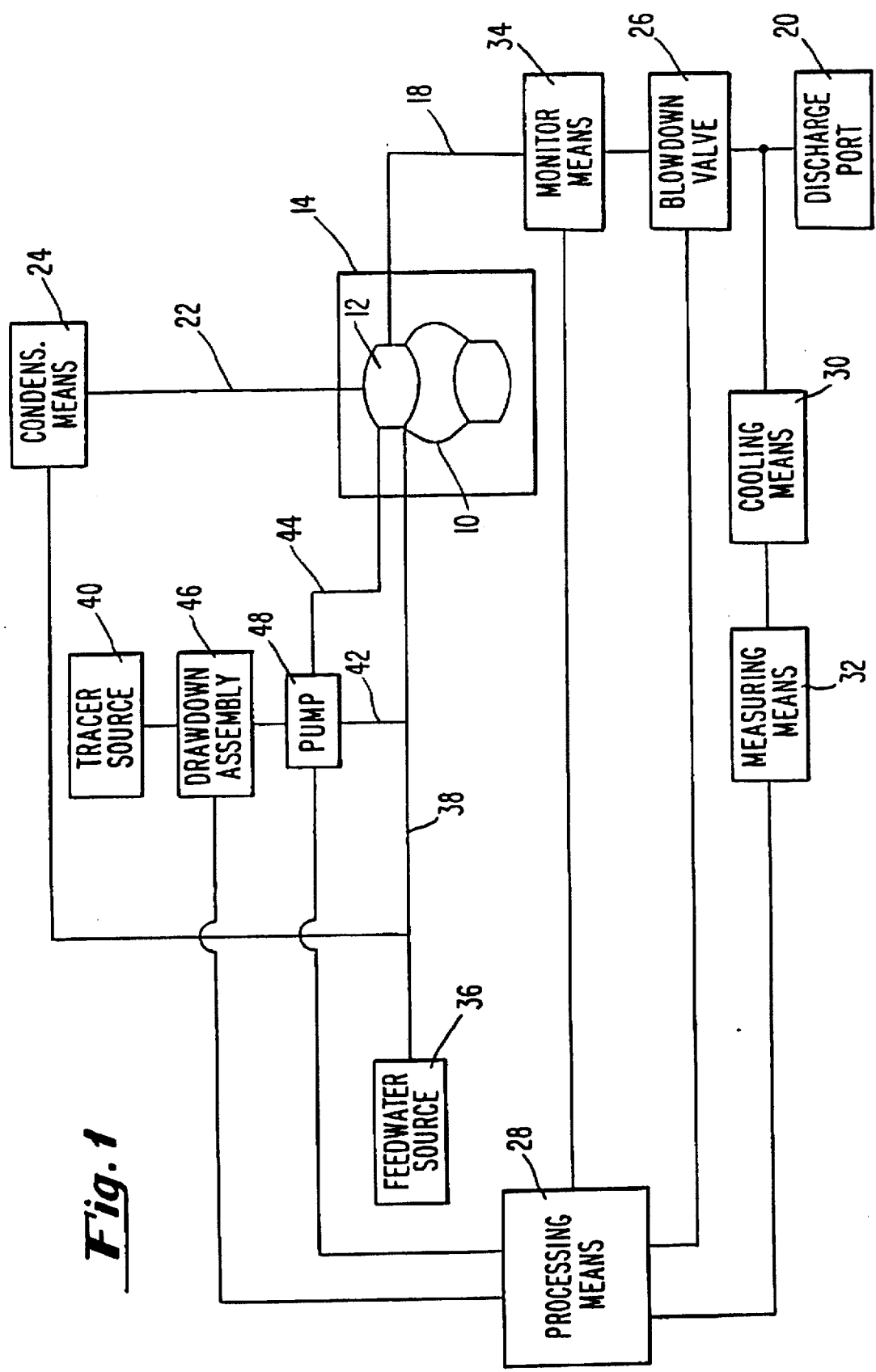

An exemplary monitoring system according to the invention is shown in FIG. 1, wherein a first ("water side") containment means or "boiler" 10 containing temperature control liquid 12 is adjacent to and in thermal communication with a second ("fire side") containment means 14 that typically contains hot vapors and a molten smelt bed. Boiler 10 is in fluid communication with blowdown line 18 for the discharge of blowdown to discharge port 20 and with steam line 22 for the discharge of steam to condensation means 24. The discharge of blowdown is controlled through actuation of blowdown valve 26, which can be operated manually or under the control of an external computer or some other processing means (not shown). It is not necessary that the blowdown valve be under control of or monitored by the system of the invention. Between boiler 10 and valve 26, blowdown line 18 is in fluid communication with monitoring means 34 to provide information on the blowdown flow rate. Downstream of valve 26, part of the blowdown flow is diverted to cooling means 30 for sampling and analysis. Measuring means 32, such as an on-line analyzer based upon UV/visible spectroscopy, is downstream of cooling means 30 to provide means for determining the concentration of tracer in the blowdown. Measuring means 32 and 34, in turn, are in electrical communication with processing means 28.

Blowdown flow monitor 34 can use any number of flowmeters designed for high temperature liquid use including orifice plate meters, vortex-shedding meters, flow nozzle meters, venturi meters, strain gauge meters, doppler (transit time) meters, turbine meters, mag meters, and pitot-type devices. Cooling means 30 can be any number of sample coolers with sufficient cooling water flowing through it to lower the sample water temperature to ambient. The selected measuring means 32 depends on the tracer being used. For example, with a molybdate tracer a FPA 800 analyzer manufactured by Tytronics (Waltham, Mass.) can be used. Alternatively, if a phosphate is used as a combined tracer and treatment chemical, a Hach (Loveland, Colo.) Series 5000 phosphate analyzer can be used.

Boiler 10 also is in fluid communication with feedwater source 36 via feed line 38. As shown in FIG. 1, feed line 38 is in fluid communication with tracer source 40 via chemical feed line 42. Alternatively, tracer source 40 is directly coupled with boiler 10 via chemical feed 44. In either embodiment, the absolute amount of tracer added to boiler 10 is controlled and recorded by processing means 28. Tracer source 40 can contain tracer or a mixture of tracer and other treatment chemicals to be fed to the boiler. Downstream of tracer source 40, a flow measurement apparatus ("drawdown assembly") 46 provides a precise measurement and control of tracer flow being injected into the feedwater line 38 via an electrically driven pump 48. Both drawdown assembly 46 and pump 48 are in electrical communication with processing means 28. Drawdown assembly 46 provides a feedback signal to processing means 28 which, in turn, controls the pumping rate of pump 48 to ensure a verified feed of chemicals to feed lines 42 or 44. Processing means 28 and associated drawdown assembly 46 preferably are constructed in accordance with the teachings of U.S. Pat. No. 4,897,797, assigned to the same assignee as this invention and incorporated by reference herein.

During normal operation, the controlled addition of feedwater to boiler 10 compensates for the removal of blowdown and steam, and maintains a desired volume of temperature control liquid 12 within boiler 10. In accordance with the present invention, the temperature control liquid is further supplemented with a known amount of at least one tracer. Tracers according to the invention are organic and/or inorganic compounds that are soluble in the feedwater, temperature control liquid, and blowdown under the operating conditions encountered. Tracers also should be thermally stable and non-volatile. In certain embodiments, the selected tracer is a reactive chemical treatment added to the boiler to, for example, control corrosion or the deposition of scale. In other embodiments, the tracer is substantially nonreactive with (i.e., inert to) the feedwater, temperature control liquid, blowdown, and contacted surfaces of the process equipment. It is preferred that the feedwater introduced to the process equipment upstream of tracer injection be substantially free of tracer, i.e., that it contain less than about 0.002 ppm of the tracer and/or that it have a tracer concentration less than about one percent of the tracer concentration of the temperature control liquid.

Tracers according to the invention possess at least one physical property that permits their detection in samples of the blowdown. Preferred tracers absorb and/or emit measurable amounts of light (or form reaction products that absorb and/or emit measurable amounts of light) in proportion to the amount of tracer present. Tracers preferably are detectable by at least one analytical technique selected from electrochemistry, UV/visible spectrophotometry, or fluorescence emission spectroscopy. Representative tracers include the tracers disclosed in U.S. Pat. No. 4,783,314 (Hoots, et al.), U.S. Pat. No. 4,966,711 (Hoots, et al.), U.S. Pat. No. 5,041,386 (Pierce, et al.), U.S. Pat. No. 5,200,106 (Hoots, et al.), U.S. Pat. No. 5,304,800 (Hoots, et al.), and U.S. Pat. No. 5,320,967 (Avallone, et al.), the contents of which are incorporated herein by reference. Preferred tracers are iodide-, sodium-, lithium-, and phosphate-containing chemical treatment and transition metal compounds, including salts, ions, oxy-anions, cations, and complexes of metals belonging to Group VIII of the Periodic Table. Particularly preferred are molybdenum-containing compounds, including molybdenum salts such as sodium molybdate.

Tracers can be added to the temperature control liquid in any number of ways. For example, tracer-containing solutions can be added directly to the temperature control liquid, they can be pre-mixed with feedwater that is added to the temperature control liquid, or they can be premixed with treatment chemicals and then added to the feedwater. The particular addition technique is not believed to be critical, so long as the tracer is added to the temperature control liquid as a liquid of known concentration at a rate that is directly proportional to the rate which blowdown is discharged. In general, the amount of added tracer should be sufficient to establish a tracer concentration of from about 0.2 to about 20 ppm in the temperature control liquid and, hence, in the blowdown. Preferably, sufficient tracer is added to establish a tracer concentration of from about 1.0 to about 5.0 ppm, more preferably from about 2.0 to about 3.0 ppm.

A natural consequence of steam generation in a boiler is a concentrating of incoming, non-volatile components. To control this "cycling up" effect, one or more volumes of the relatively-concentrated temperature control liquid typically are removed from the boiler as blowdown and corresponding volumes of relatively-dilute feedwater as added. In accordance with the present invention, the blowdown either is sampled at regular or irregular known intervals or is continuously monitored to determine the measured concentration of tracer contained therein. This determination can be made, for example, by directly or indirectly comparing the amount of light absorbed by the blowdown with the amount of light absorbed by standard solutions containing known concentrations of the tracer and other solutes found in the blowdown. Alternatively, the blowdown is mixed with a reagent that reacts with the tracer and imparts a color to the blowdown in proportion to its tracer concentration. The tracer concentration can be determined by comparing the color with the color of one or more standard solutions prepared by mixing solutions containing known concentrations of the tracer with the reagent.

The methods of the invention further involve deriving an expected concentration of tracer in the blowdown. At equilibrium, the rate at which the tracer-containing solution is added to the boiler is directly proportional to the rate at which blowdown is removed. In the absence of leaks or other means for the removal of the tracer, the amount of tracer that is added to the boiler per unit time should equal the amount of tracer that is removed from the boiler per unit time. This can be expressed as: $C_E = C_S \cdot S/B$ where:

$C_E$ is the expected equilibrium tracer concentration in the blowdown;

$C_S$ is the concentration of tracer in the tracer-containing solution;

S is the rate of addition of tracer-containing solution; and

B is the blowdown rate.

Boilers do not always operate at equilibrium. For example, non-equilibrium conditions can arise during boiler start-up or when target treatment concentrations associated with the tracer are changed. Therefore, corrections for non-equilibrium conditions should be made by modifying the equation for predicting $C_{E(i)} = C_T - [C_T - C_{(i-dt)}(e^{-Bdt/M})]$ where:

$C_{E(i)}$ = is an expected concentration of tracer in the blowdown at time i;

$C_T$ is a tracer concentration setpoint, calculated as ($C_S \cdot S/B$);

dt is an elapsed time interval;

M is the mass of the temperature control liquid; and $C_{(i-dt)}$ is a measured value for tracer concentration in the blowdown at time i–dt.

The expected and measured concentrations of tracer in the blowdown are compared, preferably by subtracting the measured concentration from the expected concentration. If all of the tracer that is added to the boiler is removed in the blowdown, the remainder will be zero, plus or minus some statistically-acceptable variance. If however, there is a leak in the boiler or in some other portion of the equipment between the point at which tracer in added and the point at which blowdown is sampled, the measured concentration of tracer in the blowdown will be significantly less than the expected concentrations. Thus, if comparison of the expected and measured concentrations indicates a statistically-significant variance, the boiler operator initiates an investigation into the source of such variance. This typically involves physical and/or acoustical examination of the boiler and, depending on the magnitude of the variance, complete shutdown of the boiler.

In another embodiment of the invention, a boiler can be monitored for leaks by measuring the amount or weight of water entering the water and comparing the amount of water exiting the boiler. This water mass balance method can be employed with the chemical tracer concentration method to monitor for leaks in a boiler and to aid in determining the source of the leak.

The water mass balance method firstly employs measurements of the amount of feedwater entering the boiler 10 from the feedwater source 36 via feed line 38. The amount of water exiting the boiler as blowdown, sootblower steam and main steam is also measured and totaled. In a boiler operating without any leaks, the amount of water entering the boiler should equal the amount of water exiting the boiler. If the amount of water exiting the boiler is larger within a defined statistical amount than the amount of water being added to the boiler, then this is indicative of the boiler having a leak at some point.

The water mass balance method is capable of detecting leaks of 5 to 10 gallons per hour. The sensitivity (detection limit) of the water mass balance method is relatively large due to the noise-generated by looking for a small number (the leak) amongst the much larger boiler numbers of feedwater added and blowdown, sootblower steam and steam removed.

The chemical balance method depends upon the loss of concentrated boiler water and will not respond to any great degree if at all to a leak in the non-cycling areas of the boiler. A monitoring system that employs both these methods in conjunction will be effective in not only monitoring a boiler for leaks but also in providing information as to whether the leak is in the cycling or the non-cycling portion of the boiler. For purposes of the present invention, cycling areas can be defined as those areas of a boiler that are affected by the changes in cycles of concentration.

Due to the differences in sensitivity, the use of the chemical balance and water mass balance will allow an operator to determine or predict if the reported leak is in the cycling areas of the boiler such as the steam drum, mud drum, reheater and waterwall and circulating tubes or the non-cycling areas such as the economizer and superheater. When the calculated variance between the measured tracer concentration and the expected tracer concentration or the difference between the rate of supplementation and rate of removal is larger than a statistically significant number, an operator initiates an investigation of the boiler for leaks. When only the variance is greater than a statistically significant number and not the difference, the operator initiates an investigation of the cycling components of the boiler for leaks.

Figure 2:
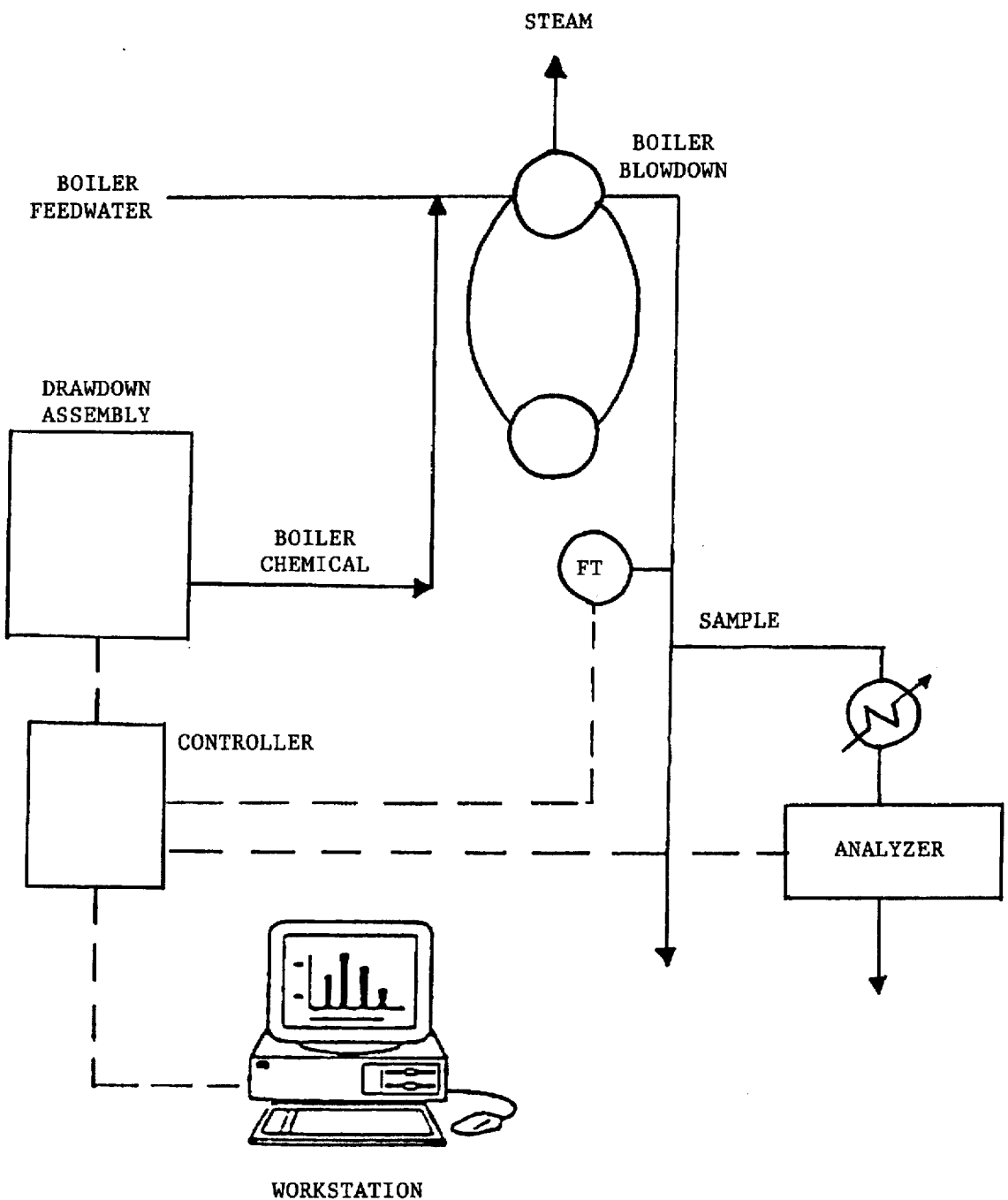
FIG. 2 represents boiler and leak detection configurations according to one aspect of the invention.

Tests for these methods were conducted in the field on a recovery boiler at a Southeastern pulp mill. The boiler and leak detection equipment configurations are shown in FIG. 2. The internal boiler water treatment program, fed to the feedwater, is phosphate-based. This phosphate was used as the tracer for the leak detection scheme. The treatment was fed using a Betz PaceSetter Plus® automated chemical feed system.

A Hach Series 5000™ phosphate analyzer was installed on a conditioned boiler blowdown sample stream. An orifice plate flowmeter was installed in the blowdown line. The phosphate formulation was fed proportional to the blowdown flow to achieve a boiler phosphate concentration within a specified range.

To provide a convenient way to simulate leaks, an auxiliary blowdown stream was installed on a drain line from a waterwell header. Based upon the available cooling capacity, it was possible to simulate leaks of up to 907 kg/hr (2000 lb/hr).

The water mass balance was also monitored using the feedwater, blowdown, sootblower steam, and main steam flowrates.

WATERWELL LEAKS

Leaks of 454 kg/hr (1000 lb/hr) and 907 kg/hr (2000 lb/hr) were introduced using the auxiliary blowdown test stream. These correspond to approximately 28% and 46% of blowdown flow. For the 454 kg/hr leak, the leak indicator signal increased from 3% to 20% in approximately 50 hours. An arbitrary leak alarm level of 10 was assigned for the chemical balance method. This signal was reached 14 hours after initiating the leak. For the 907 kg/hr leak, the leak signal increased from 2% to 23% in approximately 37 hours. The signal alarm level signal was reached 12 hours after initiating this leak.

Several points are noted about these leaks. The leaks easily detected by the chemical balance method were too small to be detected above the background noise using the mass balance method. The water balance ranged from −1400 up to +1400 kg/hr (−/+3000 lb/hr).

Second, the leak indicator signals were not simply proportional to absolute leak size. Third, the blowdown flow was decreased by 20% in the middle of the 454 kg/hr leak with little effect on the leak indicator signal for the following 5 days. If there were to be an effect, it should have shown up during this time period, thereby demonstrating that boiler cycles can be changed without affecting the leak detection scheme.

ECONOMIZER LEAKS

The particular boiler tested had been experiencing economizer leaks. On two occasions, leaks were indicated with the water mass balance, but operators were unable to see or hear the leak during a "walkdown" of the boiler. The first leak grew to 9100 kg/hr (20,000 lb/hr) before shutdown of the boiler. The second leak grew to 3200 kg/hr (7000 lb/hr). If these leaks had been the boiler waterwell or generating bank, the effect on the chemical mass balance would have been dramatic. For both leaks, the chemical balance method indicator showed no significant change.

In both these instances, the leaks were subsequently found in the economizer. The combined information of a water mass balance and a chemical balance provided the boiler operators with the assurance that the leak was not in a waterwell tube and must be either in the economizer or the superheater.

It should be noted that, in this particular boiler, the treatment chemicals are added upstream of the economizer. Therefore, some chemical is lost in an economizer leak. The effect of this lost chemical on the chemical leak indicator is insignificant because the concentration of chemical in the economizer is very low. In many boiler systems, the treatment chemicals are added to the steam drum which eliminates the possibility of losing any chemical as a result of an economizer leak.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

Having thus described the invention, what we claim is:

1. A method for monitoring a boiler in which a temperature control liquid in a containment means is supplemented with feedwater and is removed as blowdown, sootblower steam and main steam, said method comprising the steps of:
   monitoring a rate associated with said blowdown removal;
   deriving a rate for adding a tracer to said temperature control liquid based on said monitored blowdown removal rate; adding said tracer to said temperature control liquid at said tracer addition rate;
   deriving an expected concentration of said tracer in said blowdown based on said rate of tracer addition to said temperature control liquid;
   comparing said measured tracer concentration with said expected tracer concentration to detect variance there between indicative of leakage in said boiler;
   initiating an investigation of the cycling components of said boiler in response to said variance; and
   monitoring a rate associated with said feedwater supplementation;
   monitoring a rate associated with said blowdown, sootblower steam and main steam removal;
   comparing said rate of supplementation with said rate of removal to detect a difference therebetween indicative of leakage in said boiler;
   initiating an investigation of the non-cycling components of said boiler in response to said difference.

2. The method of claim 1 wherein said tracer is a transition metal compound.

3. The method of claim 1 wherein said tracer is a molybdenum compound.

4. The method of claim 1 wherein said tracer is a molybdenum salt.

5. The method of claim 1 wherein said tracer is sodium molybdate.

6. The method of claim 1 wherein said tracer is iodide ion, lithium ion, or phosphate ion.

7. The method of claim 1 wherein determining said measured tracer concentration comprises detecting a property of the tracer in said blowdown.

8. The method of claim 1 wherein determining said measured tracer concentration comprises comparing said blowdown with a standard solution containing a known concentration of said tracer.

9. The method of claim 8 wherein said comparison is performed visually or using electrochemistry, UV/visible spectrophotometry, or fluorescence emission spectroscopy.

10. The method of claim 1 wherein said blowdown is continuously monitored for tracer concentration.

11. The method of claim 1 wherein said blowdown is sampled.

12. The method of claim 11 wherein a series of samples of said blowdown are taken at regular intervals.

13. The method of claim 11 wherein a series of samples of said blowdown are taken at irregular intervals.

14. The method of claim 11 wherein determining said measured tracer concentration in said sample comprises:
   mixing said sample with a reagent that reacts with said tracer and imparts a color to said sample in proportion to the concentration of tracer in said sample;
   detecting said sample color; and
   comparing said sample color with one or more colored standard solutions prepared by mixing solutions containing known concentrations of said tracer with said reagent.

15. The method of claim 14 wherein said color is detected using UV/visible spectrophotometry.

16. The method of claim 1 wherein said tracer is added as a tracer-containing solution.

17. The method of claim 16 wherein said expected concentration of tracer in said blowdown is derived according to the formula: $C_E = C_S \cdot S/B$ where:

$C_E$ is the expected equilibrium tracer concentration in the blowdown;

$C_S$ is the concentration of tracer in the tracer-containing solution;

S is the rate of addition of tracer-containing solution; and

B is the blowdown rate.

18. The method of claim 16 wherein said expected concentration of tracer in said blowdown is derived according to the formula: $C_{E(i)} = C_T - [C_T - C_{(i-dt)}(e^{-Bdt/M})]$ where:

$C_{E(i)}$ = is an expected concentration of tracer in the blowdown at time i;

$C_T$ is a tracer concentration setpoint, calculated as $(C_S \cdot S/B)$;

$C_E$ is the concentration of tracer in said tracer-containing solution;

S is the rate of addition of said tracer-containing solution;

B is the blowdown removal rate; dt is an elapsed time interval;

M is the mass of the temperature control liquid; and $C_{(i-dt)}$ is a measured value for tracer concentration in the blowdown at time i–dt.

19. The method of claim 1 wherein comparing said measured tracer concentration with said expected tracer concentration comprises subtracting said measured tracer concentration from said expected tracer concentration.

20. The method of claim 1 wherein said tracer controls corrosion or deposition of scale in said containment means.

21. The method of claim 1 further comprising adding a treating agent to said temperature control liquid in an amount effective to control corrosion or deposition of scale in said containment means.

22. The method of claim 21 further comprising physically analyzing said boiler in response to both a difference between said rate of supplementation and said rate of removal and a variance between measured tracer concentration and said expected tracer concentration.

23. The method of claim 1 further comprising physically analyzing said boiler in response to a variance between said measured tracer concentration and said expected tracer concentration.

24. The method of claim 1 wherein comparing said rate of supplementation with said rate of removal comprises subtracting said rate of removal from said rate of supplementation.

25. The method of claim 1 further comprising physically analyzing said boiler in response to a difference between said rate of supplementation and said rate of removal.

26. The method of claim 1 further comprising analyzing the non-cycling components of said boiler in response to a statistically significant difference between said rate of supplementation and said rate of removal and there is no statistically significant variance between said measured tracer concentration and said expected tracer concentration.

27. A system for monitoring a boiler in which a temperature control liquid in a containment means is supplemented with feedwater and removed as blowdown, sootblower steam and main steam, said system comprising:

means in communication with said containment means or monitoring a rate associated with said blowdown removal;

means for deriving a rate for adding a tracer to said temperature control liquid based on said monitored blowdown removal rate;

means in communication with said containment means for monitoring a rate associated with said sootblower steam and main steam removal;

means in communication with said containment means for monitoring a rate associated with said feedwater supplementation;

addition means in communication with said containment means and said rate derivation means for adding an amount of tracer to said containment means at said tracer addition rate;

measuring means in communication with said addition means for measuring a concentration of said tracer in said blowdown;

derivation means in communication with said measuring means for deriving an expected concentration of tracer in said blowdown;

comparison means in communication with said derivation means for comparing said measured tracer concentration with said expected tracer concentration; and measuring means in communication with said feedwater supplementation for measuring said supplementation;

measuring means in communication with said blowdown removal for measuring said blowdown removal;

measuring means in communication with said sootblower steam and main steam removal for measuring said removal; and comparison means in communication with said measuring means for comparing said measured feedwater supplementation with said blowdown, sootblower steam and main steam removal.

28. The system of claim 27 wherein said addition means comprises a tracer source coupled with a flow measurement apparatus and a feed line.

29. The system of claim 27 wherein said concentration of said tracer is measured with a UV/visible spectrophotometer.

30. The system of claim 27 wherein said derivation means comprises processing means coupled with said addition means and said comparison means.

31. The system of claim 27 wherein said comparison means comprises processing means coupled with said derivation means.

* * * * *